US008430125B2

(12) United States Patent
Massie et al.

(10) Patent No.: US 8,430,125 B2
(45) Date of Patent: Apr. 30, 2013

(54) COMBINED CONTROL VALVE AND COUPLER

(75) Inventors: Andrew E Massie, Fintray (GB); Andrew D Gledhill, Stonehaven (GB)

(73) Assignee: Aker Subsea Limited, Berkshire (GB)

( * ) Notice: Subject to any disclaimer, the term of this patent is extended or adjusted under 35 U.S.C. 154(b) by 602 days.

(21) Appl. No.: 12/666,844

(22) PCT Filed: Jun. 23, 2008

(86) PCT No.: PCT/GB2008/002141
§ 371 (c)(1),
(2), (4) Date: Apr. 20, 2010

(87) PCT Pub. No.: WO2009/001056
PCT Pub. Date: Dec. 31, 2008

(65) Prior Publication Data
US 2011/0175003 A1    Jul. 21, 2011

(30) Foreign Application Priority Data
Jun. 28, 2007  (GB) .................................. 0712566.9

(51) Int. Cl.
*G05D 16/06* (2006.01)
(52) U.S. Cl.
USPC ................. 137/613; 137/625.64; 137/625.68; 251/149.6; 251/325
(58) Field of Classification Search .................. 137/529, 137/535, 540, 613–614.06, 625.64, 625.68, 137/861, 871–872; 251/129.15, 149–149.7, 251/325
See application file for complete search history.

(56) References Cited

U.S. PATENT DOCUMENTS

| | | | |
|---|---|---|---|
| 3,646,965 A | | 3/1972 | Swartz |
| 4,809,749 A | * | 3/1989 | Ichihashi .................. 137/625.65 |
| 4,869,300 A | * | 9/1989 | Gudenau et al. ................. 141/59 |
| 5,289,850 A | | 3/1994 | Sarson et al. |
| 5,368,070 A | | 11/1994 | Bosley |
| 5,465,754 A | * | 11/1995 | Sudo et al. .................. 137/614.2 |
| 5,810,047 A | | 9/1998 | Kirkman |
| 5,937,899 A | * | 8/1999 | Zeiber ........................... 137/614 |
| 2002/0079473 A1 | * | 6/2002 | Jeory ......................... 251/149.6 |
| 2007/0193638 A1 | * | 8/2007 | Kwon ........................... 137/613 |

FOREIGN PATENT DOCUMENTS

| | | |
|---|---|---|
| DE | 295 13 000 | 10/1995 |
| EP | 0 476 518 | 3/1992 |
| FR | 1 298 463 | 7/1962 |

(Continued)

OTHER PUBLICATIONS

International Search Report for PCT/GB2008/002141, mailed Nov. 6, 2008.

(Continued)

*Primary Examiner* — Eric Keasel
*Assistant Examiner* — R. K. Arundale
(74) *Attorney, Agent, or Firm* — Nixon & Vanderhye PC

(57) ABSTRACT

A control valve includes a body including an internal passageway and is constituted at one end as a coupler that includes a valve poppet openable to allow fluid access to or from the passageway past the poppet. The body defines at least one lateral port. A valve spool is disposed within the body and is movable lengthwise of the body by a solenoid actuator, disposed at the other end of the body, to control fluid communication between the passageway and the lateral port.

11 Claims, 1 Drawing Sheet

FOREIGN PATENT DOCUMENTS

| | | |
|---|---|---|
| GB | 2 149 889 | 6/1985 |
| GB | 2 227 295 | 7/1990 |
| GB | 2 344 405 | 6/2000 |
| WO | WO 2005/096695 | 10/2005 |
| WO | WO 2007/045811 | 4/2007 |

OTHER PUBLICATIONS

Written Opinion for PCT/GB2008/002141, mailed Nov. 6, 2008.
GB Search Report for GB 0712566.9, dated Sep. 23, 2007.

* cited by examiner

COMBINED CONTROL VALVE AND COUPLER

This application is the U.S. national phase of International Application No. PCT/GB2008/002141 filed 23 Jun. 2008 which designated the U.S. and claims priority to GB Application No. 0712566.9 filed 28 Jun. 2007, the entire contents of each of which are hereby incorporated by reference.

BACKGROUND

1. Technical Field

This document relates to control valves, particularly directional control valves, and couplers of the general kind that are used in subsea installations such as manifolds associated with subsea wells.

2. Related Art

A control valve of this kind comprises a body which has a plurality of ports, the communication between the ports being controlled by a valve member which may be in the form of a rod or spool and which is movable lengthwise, usually but not necessarily between operational positions. The control valve may be specifically a directional control valve in which a supply port is connected, in a manner dependent on the particular construction of the valve, to a 'function' port for one position of the valve member. The function port may be connected to a return or exhaust port for another position of the valve member. Preferably the control valve is operated by a solenoid actuator, the valve member carrying or constituting an armature of the solenoid. The valve member may have lip seals or shear seals that cooperate with the valve body in which the ports are provided. Control valves of this kind are described in GB-2344405.

A coupler is employed to connect hydraulic lines. Typically couplers are provided in pairs, each consisting of a male or probe coupler and a female or socket coupler. It has been customary to mount an array of male couplers on a 'stab' plate for simultaneous mating with an array of female couplers on another 'stab' plate. In a typical construction the couplers of the pair each have an internal valve poppet which is lifted from its seat when the couplers of the pair are mated. The probe and socket usually have intermediate seals, which may be radial seals. Typical couplers are described in U.S. Pat. No. 5,810,047, U.S. Pat. No. 5,368,070 and WO2007/045811.

BRIEF SUMMARY

In current practice standard designs require several interfaces. It would be desirable to reduce the number of interfaces, reduce the size and weight of components and the total space required for an installation and generally achieve more efficient manufacture.

The exemplary embodiment is directed toward a control valve which comprises a body including an internal passageway and in which: the body constitutes at one end a coupler which includes a valve poppet openable to allow fluid access to or from the passageway past the poppet valve; the body defines at least one lateral port; and a valve member is disposed within the body and is movable lengthwise of the body to control fluid communication between the said passageway and said at least one lateral port.

Preferably an electrical actuator for causing the movement of the said valve member is disposed as an extension to the body at the end opposite the coupler.

Preferably the body is adapted for insertion through and securing within a mounting aperture extending transversely through a mounting plate. The lateral port may be positioned to communicate with a gallery within the mounting plate. The body may have an abutment which is disposed to cooperate with a step in the mounting aperture to provide correct location of the body within the aperture.

BRIEF DESCRIPTION OF THE DRAWINGS

There follows a detailed description of one exemplary embodiment of the invention with reference to the accompanying drawings.

DETAILED DESCRIPTION OF EXEMPLARY EMBODIMENTS

Figure 1:
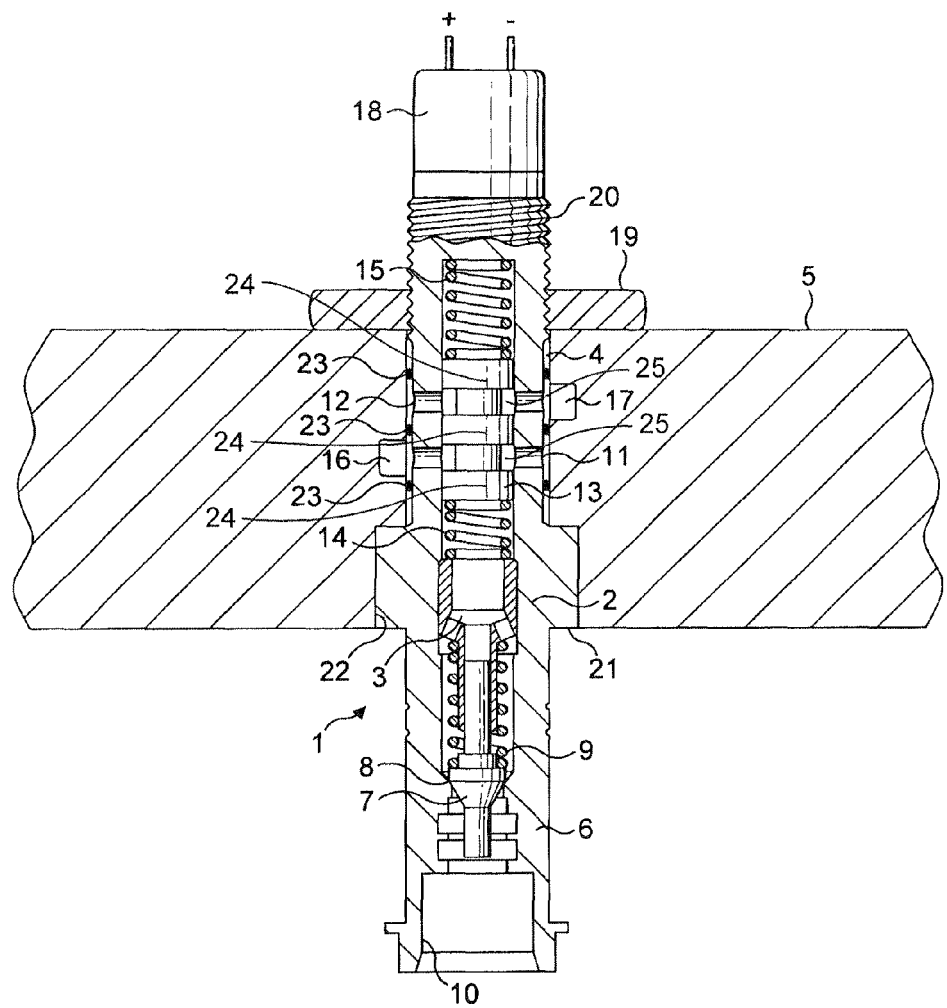
FIG. 1 is a sectional view through a control valve mounted in a base plate.

FIG. 1 illustrates a valve 1 according to an embodiment of the invention. The valve has an elongate body 2 which has an internal passageway 3. The body 2 is fitted through and is secured within a mounting aperture 4, in this example a hole extending transversely of a base plate 5.

At one end, the lower end 6 as shown in the Figure, the body 2 is constituted as a subsea coupler. In this example the coupler is a female coupler which has a spring-loaded valve poppet 7 held against a valve seat 8 in the passageway by a compression spring 9. When the coupler mates with a complementary (male) coupler inserted in the socket 10 of the coupler 6, the poppet 7 is depressed to allow fluid communication past the poppet with the internal passageway 3. The complementary coupler (not shown) may, as is usual, be connected by a hydraulic line to a source of highly pressurised hydraulic fluid. The coupler may itself be constructed in the manner described in the relevant documents identified above.

In the middle portion of the body 2 are lateral annular ports 11 and 12. These may be coupled to each other or to the internal passageway 3, depending on the intended functions, according to the position of a valve member comprising a spool 13. Springs 14 and 15 engage opposite ends of the spool (in this example) to maintain the spool in a neutral position in the absence of actuating force on the spool 13.

The ports 11 and 12 are positioned to communicate with respective fluid galleries 16 and 17 in the base plate. These galleries may communicate in any desired manner with hydraulically actuated devices. In this example the spool 13 is balanced with respect to line pressure and has a longitudinal passage 24 connecting the ends of the spool, with transverse passages 25 connecting that passage to the ports 11 and 12. Various other configurations are feasible.

At the end opposite the coupler 6 an extension of the body 2 houses an electrical actuator, preferably a solenoid actuator 18. The spool 13 is adapted (in known manner) to be an armature for this actuator, and is moved lengthwise under the control of the actuator to control the communication between the internal passageway and at least one of the lateral ports 11 and 12.

At one side, in this example the upper side, of the mounting plate 5 a nut 19 engages a threading 20 on the outside of the body 2. The body 2 has near its other end an (integral) abutment shoulder 21 which engages a step 22 in the hole 4. The body can be drawn upwardly by rotation of the nut until the shoulder and the step prevent further movement and the body is correctly positioned in the hole 4, the ports 11 and 12 being aligned with the galleries 16 and 17. Other fixing and locating means may be employed.

Sealing rings 23 are preferably disposed above and below the ports 11 and 12 to prevent fluid flow along the outside of the body between these ports.

Figure 2:
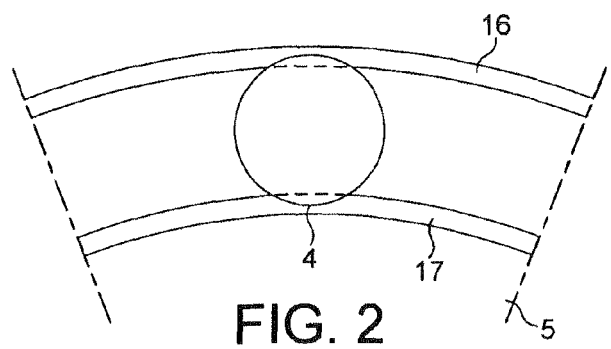
FIG. 2 illustrates part of a baseplate.

FIG. 2 illustrates the intersection of the hole 4 with the galleries 16 and 17 in the plate 5.

The combined control valve and coupler may, but need not be, used in conjunction with a radially-ported electron-beam welded manifold baseplate. The fitment of the combined valve and coupler may interface directly with the porting in the base plate, thereby using the baseplate as its pressure-containing body.

Preferably the combination of the valve and coupler is disposed vertically as shown, with the solenoid actuator at the top. This disposition allows for easy access for wiring and maintenance.

What is claimed is:

1. A hydraulic control valve which comprises: an elongate body including an internal longitudinal passageway, said body including at one end thereof a coupler which includes a valve poppet openable to allow fluid access to said internal longitudinal passageway past said valve poppet, said coupler being disposed within said body; at least one port defined in said body and disposed laterally of said internal longitudinal passageway; a valve member disposed within said body and movable lengthwise of the body to control fluid communication between said internal longitudinal passageway and said at least one port; and an electrical actuator for causing the movement of said valve member, said electrical actuator being disposed as an extension to the body at a second end opposite said one end.

2. The hydraulic control valve of claim 1 wherein said body is adapted for insertion through and securing within a mounting aperture in a mounting plate, said body having an external abutment which is disposed to cooperate with a step in said mounting aperture to provide correct location of said body within said mounting aperture.

3. The hydraulic control valve of claim 2 wherein said lateral port is positioned to communicate with a gallery within said mounting plate.

4. The hydraulic control valve of claim 1 and further comprising a valve seat for said valve poppet, and a spring for urging said valve poppet against said valve seat, said valve poppet being depressible away from said valve seat on mating of said coupler with a complementary coupler.

5. The hydraulic control valve of claim 1 and further comprising respective springs engaging opposite ends of said valve member to maintain said valve member in a neutral position in the absence of actuating force on said valve member.

6. A hydraulic control valve assembly comprising: a mounting plate including a mounting aperture extending through the mounting plate; an elongate body for insertion through and mounting within said mounting plate, said body including an internal longitudinal passageway, said body including at one end thereof a coupler which includes a valve poppet openable to allow fluid access to said internal longitudinal passageway past said valve poppet, said coupler being disposed within said body; at least one port defined in said body and disposed laterally of said internal longitudinal passageway; a valve member disposed within said internal longitudinal passageway and movable lengthwise of said body to control fluid communication between said internal longitudinal passageway and said at least one port; and an electrical actuator for causing the movement of said valve member, said electrical actuator being disposed as an extension to the body at a second end opposite said one end.

7. The hydraulic control valve assembly of claim 6 in which the body has an abutment which is disposed to cooperate with a step in said mounting aperture to provide correct location of said body within said mounting aperture.

8. The hydraulic control valve assembly of claim 6 in which said mounting plate includes a gallery and said lateral port is positioned to communicate with said gallery.

9. The hydraulic control valve assembly of claim 6 and further comprising a valve seat for said valve poppet, and a spring for urging said valve poppet against said valve seat, said valve poppet being depressible away from said valve seat on mating of said coupler with a complementary coupler.

10. A hydraulic control valve assembly comprising: a mounting plate including a mounting aperture extending through the mounting plate, said mounting aperture including a step; an elongate body for insertion through and mounting within said mounting plate, said body including an internal longitudinal passageway, said body including at one end thereof a coupler which includes a valve poppet openable to allow fluid access to said internal longitudinal passageway past said valve poppet, said coupler being disposed within said body; at least one port defined in said body and disposed laterally of said internal longitudinal passageway; and a valve member disposed within said body and movable lengthwise of said body to control fluid communication between said internal longitudinal passageway and said at least one port, said mounting plate including a gallery and said lateral port being positioned to communicate with said gallery; wherein said body has an abutment disposed to cooperate with a step in said mounting aperture to provide correct location of said body within said mounting aperture.

11. The hydraulic control valve assembly of claim 10 and further comprising an electrical actuator for causing the movement of said valve member, said electrical actuator being disposed as an extension to the body at a second end opposite said one end.

* * * * *